US012027078B2

(12) United States Patent
Crawley et al.

(10) Patent No.: US 12,027,078 B2
(45) Date of Patent: Jul. 2, 2024

(54) BARRIER SIGN KIT

(71) Applicant: Tensator Group Ltd, Milton Keynes (GB)

(72) Inventors: Peter James Crawley, Milton Keynes (GB); Alan Robert McPherson, Milton Keynes (GB)

(73) Assignee: TENSATOR GROUP LTD (GB)

( * ) Notice: Subject to any disclaimer, the term of this patent is extended or adjusted under 35 U.S.C. 154(b) by 0 days.

(21) Appl. No.: 17/837,311

(22) Filed: Jun. 10, 2022

(65) Prior Publication Data

US 2022/0398946 A1 Dec. 15, 2022

(30) Foreign Application Priority Data

Jun. 15, 2021 (GB) ...................................... 2108532

(51) Int. Cl.
*G09F 7/18* (2006.01)
*E01F 13/02* (2006.01)

(52) U.S. Cl.
CPC .............. *G09F 7/18* (2013.01); *E01F 13/022* (2013.01); *G09F 2007/1821* (2013.01)

(58) Field of Classification Search
CPC ............... G09F 7/18; G09F 2007/1821; G09F 2007/1804; G09F 1/10; E01F 13/022; E01F 13/02
See application file for complete search history.

(56) References Cited

U.S. PATENT DOCUMENTS 707,205 A * 8/1902 Butt ........................ G09F 13/04 40/611.06
1,308,792 A * 7/1919 Leitch ........................ G09F 3/14 40/663
1,476,898 A * 12/1923 Lewis ........................ G09F 7/00 40/606.15
2,022,160 A * 11/1935 Sorensen .................. G09F 7/20 40/607.06
3,312,034 A * 4/1967 Steinmann .............. E01F 9/623 403/387
4,232,467 A * 11/1980 Stewart ..................... G09F 7/18 248/533
(Continued)

FOREIGN PATENT DOCUMENTS

DE 102018132494 A1 6/2020
EP 3916702 A1 * 12/2021 .............. E01F 13/02
(Continued)

OTHER PUBLICATIONS

Search Report Under Section 17, dated Dec. 6, 2021, issued in corresponding UK Application No. GB 2108532.9.

*Primary Examiner* — Cassandra Davis
(74) *Attorney, Agent, or Firm* — OSTROLENK FABER LLP

(57) ABSTRACT

A barrier sign kit that includes a barrier post having one or more vertically oriented splines positioned on an outer side; and a rigid planar sign member having an aperture sized and shaped to securely mount the sign member on a spline. The planar sign member can be mounted on the spline of the barrier post to provide a simple sign mounting on the barrier post. The barrier post may be a conventional barrier post as used in existing queueing solutions. The sign member may be formed of rigid card or plastic.

8 Claims, 4 Drawing Sheets

(56) References Cited

U.S. PATENT DOCUMENTS

| | | | | | |
|---|---|---|---|---|---|
| 5,050,828 | A * | 9/1991 | Wolff | E01F 9/685 | 248/156 |
| 5,709,057 | A * | 1/1998 | Johnson, Jr | E01F 9/65 | 52/27 |
| 7,055,272 | B2 * | 6/2006 | Tollis | G09F 7/00 | 40/607.01 |
| 2007/0256341 | A1 * | 11/2007 | Mclaughlin | G09F 7/18 | 40/607.13 |
| 2013/0015148 | A1 * | 1/2013 | Valiulis | A47F 5/0006 | 29/428 |
| 2018/0216779 | A1 * | 8/2018 | Damiano | F16M 13/02 | |

FOREIGN PATENT DOCUMENTS

| | | | | |
|---|---|---|---|---|
| FR | 2343198 | A * | 11/1977 | E01F 13/02 |
| GB | 2416906 | A | 2/2006 | |

* cited by examiner

BARRIER SIGN KIT

CROSS-REFERENCE TO RELATED APPLICATION

The present application claims priority to United Kingdom Patent Application No. GB 2108532.9 Filed on Jun. 15, 2021, the content of which is incorporated herein by reference.

FIELD OF THE INVENTION

The present invention relates to temporary or semi-permanent barrier posts, such as those used to form barriers in retail outlets and airports. In particular, the present invention relates to the provision of signs and advertising on such barrier posts.

BACKGROUND TO THE INVENTION

Barrier posts are commonly used as part of crowd control and queue management. For example, portable or fixed barrier posts are commonly used to control queues at airports and at retail outlets. In such locations, the barrier posts have one or more barrier members extending between the posts to direct a queue. Some such barrier members are extendable from the barrier post. Alternative barrier members are ropes or other flexible members that can be removably attached to the barrier posts. Further alternative barrier members are rigid members that are permanently or removably attached to the barrier posts. Most barrier posts either have one or more barrier member extending from an upper end or one or more means for mounting barrier posts formed at an upper end.

Many barrier posts have splines formed on an outer surface to allow a barrier member to be mounted thereto. Some barrier posts have splines onto which a mounting portion of an extendable barrier member can be vertically slid onto and thereby act to hold the extendable barrier in place. In order to facilitate this the mounting portions of the extendable barrier member are generally formed to conform with and engage with the spline of the barrier. Generally, the splines will be formed to have two parallel vertically oriented channels on opposing lateral sides of the spline, the channels extending downwards from an upper end of the spline and ending a distance above a lower end of the spline. The mounting portions of the barrier members are designed to be slid downwards onto the spline from the upper end of the spline to a lower end of the channels. As the channels end above a lower end of the spline the mounting portions of the barrier are supported by the spline and cannot be pulled downwards out of the channels.

In order to provide information to people signs are commonly mounted on top of barrier posts. For example, signs giving information on the direction of queueing, the reasons for a queue, or advertising are mounted on top of barrier posts may be provided. This can be achieved in a variety of ways. One simple way of mounting signs on top of a post is to provide a frame, within which a sign can be inserted, at the upper end of a barrier post. Such frames are commonly formed of metal and allow a suitable printed card to be inserted into and removed therefrom. The frames usually sit at the top of a mounting that is permanently or removably attached to the upper end of the barrier post. Such frames are relatively simple to use but relatively expensive and, relatively fragile. Alternative means for positioning signs on top of barrier posts are also available but these tend to be more complex and expensive. Therefore, there is a need for a simpler and cheaper apparatus for mounting signs on top of barrier posts.

SUMMARY OF THE INVENTION

The present invention provides a barrier sign kit consisting of:

- a barrier post having one or more vertically oriented spline positioned on an outer side; and
- a rigid planar sign member comprising an aperture sized and shaped to securely mount the sign member on a spline.

The present invention provides a simple kit for providing a barrier post with a sign member mounted thereon. In particular, the kit of the present invention results in a simple planar sign member being resiliently mounted on a spline of a barrier post, utilising the spline of the barrier post as a resilient mounting for the sign member. This is beneficial compared to barrier sign kits according to the prior art, which as described above, require specifically formed attachments to mount over the top of the barrier post or other complex attaching means for attaching a sign member to a barrier post.

The barrier post of the sign kit can be a conventional barrier post comprising one or more splines, as might be used in conventional barrier queueing systems, such as those commonly used at airports. Alternatively, a barrier post of the sign kit may be specifically formed for use in the present invention. A spline of the barrier post may be located adjacent an upper end of the barrier post. A spline of the barrier post may be located part-way up the barrier post. The barrier post may comprise a plurality of splines located at an upper end of the barrier post, located part-way up the barrier post, or located at a combination of these locations, or located at any other suitable location on the barrier post.

A spline of the barrier post can be formed in any suitable manner to allow it to engage with the aperture of the sign member. Generally conventional barrier posts will be used and will have splines that are formed to engage with a mounting portion of an extendable barrier member. Splines formed in this manner are particularly suitable for use with the present invention. However, splines formed and intended to engage with an aperture of the sign member may also be used. The skilled person will readily appreciate the form that such splines can take.

The sign member of the present invention is a rigid planar member that is supported on a barrier post by the aperture engaging with a spline of the post. The sign member may have any appropriate information and/or signage displayed on either planar side of the sign member. For example, the sign member may be used to display directions or advertisements or any other useful information or graphics. Alternatively or additionally and as described further below, the sign member may be utilised to mount goods thereon.

In embodiments of the invention the aperture of the sign member may be formed at or proximate a lower end of the sign member such that when the sign member is mounted on a spline the sign member extends upwards from the spline. In this manner, the sign kit of the present invention can provide an upstanding sign mounted on a spline. If a spline is formed at or near an upper end of the barrier post then the sign member can extend upwardly from an upper end of the barrier post.

In embodiments of the invention the aperture of the sign member may be formed proximate an upper end of the sign member such that when the sign member is mounted on a spline, the sign member extends downwards from the spline. This can provide a downwardly extending sign member wherein the sign member is hanging down from a spline. In such embodiments the sign member can comprise one or more cut out mounting hooks for mounting goods on the sign member. The formation of such cut out mounting hooks will be immediately apparent to the skilled person as they are commonly used in retail outlets to display hanging products.

In embodiments of the invention the aperture of the sign member may be formed centrally, between an upper and lower end of the sign member, such that the sign member extends upwardly and downwardly from a spline that it is mounted upon. In embodiments of the invention the sign member may comprise a plurality of apertures at different locations along the sign member to facilitate mounting of the sign member in different positions upon a spline.

The sign member of the present invention may be formed of any suitable material including but not limited to rigid polymers, rigid card, metal, and wood.

In embodiments of the invention a spline may be formed to have two parallel vertically oriented channels on opposing lateral sides of the spline, the channels extending downwards from an upper end of the spline and ending a distance above a lower end of the spline. This is a conventional way in which splines are formed on barrier posts for conventional extendable barrier post queueing systems. If a spline is formed in this manner the aperture of the sign member will be formed to conform to the shape of the spline. For example, the aperture of the sign member may consist of a relatively narrower upper portion to conform to the channels of the spline and a relatively wider lower portion formed to conform to the lower end of the spline.

In such embodiments the aperture may have a "thermometer bulb" shape with a rounded relatively wider lower portion and a vertically extending slot extending upwards from the lower portion.

In embodiments of the invention the aperture may consist of a vertically extending slot. The slot may extend upwardly from a lower edge of the sign member or may be formed centrally within the sign member.

Further features and advantages of the invention will be apparent from the preferred embodiments of the invention described below and shown in the Figures.

DRAWINGS

Three embodiments of the invention are shown in the Figures. To aid understanding of the invention, the same reference numerals have been used in each figure to refer to equivalent features of each embodiment.

Figure 1:
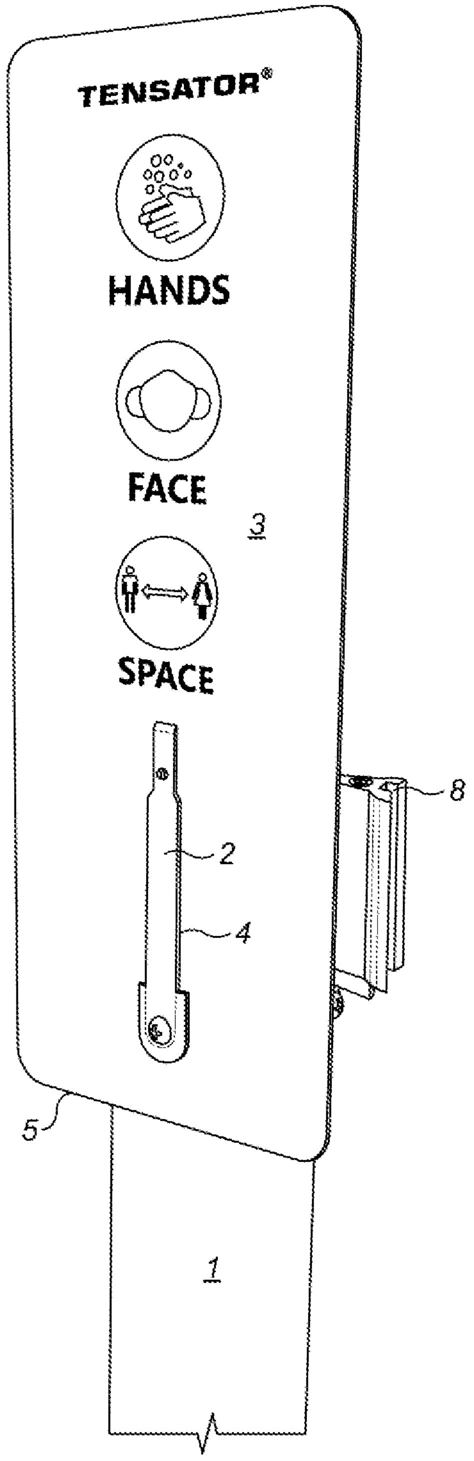
FIG. 1 shows a first embodiment of a barrier sign kit according to the present invention.

A first embodiment of a barrier sign kit according to the present invention is shown in FIG. 1. The barrier sign kit consists of a barrier post 1 with a spline 2 formed adjacent an upper end and rigid planar sign member 3 having an aperture 4 formed adjacent a lower end 5. The sign member 3 is mounted on the barrier post 1 by mounting the spline 2 through the aperture 4. The sign member 3 extends upwardly beyond the upper end of the barrier post 1. As can be seen in the Figure, the aperture 4 is sized and shaped to securely mount the sign member 3 on the barrier post 1.

The spline 2 has a conventional shape found in many currently available barrier posts. In particular, the spline 2 is formed to have two parallel vertically oriented channels on opposing lateral sides of the spline, the channels extending downwards from an upper end of the spline and ending a distance above a lower end of the spline. The aperture 4 has a "thermometer bulb" shape to conform to the spline 2. That is, the aperture 4 has a relatively narrower upper portion to conform to the channels of the spline 2 and a relatively wider lower portion formed to conform to the lower end of the spline 2.

The barrier post 1 has an extendable barrier member 8 formed at an upper end. This can be used to form a barrier between the barrier post 1 and an adjacent barrier post (not shown). The barrier post 1 can be used in the same manner as any other conventional barrier post to form a barrier, with the sign member 3 mounted on a spline 2 of the barrier post 1 that would otherwise be unused.

Figure 2:
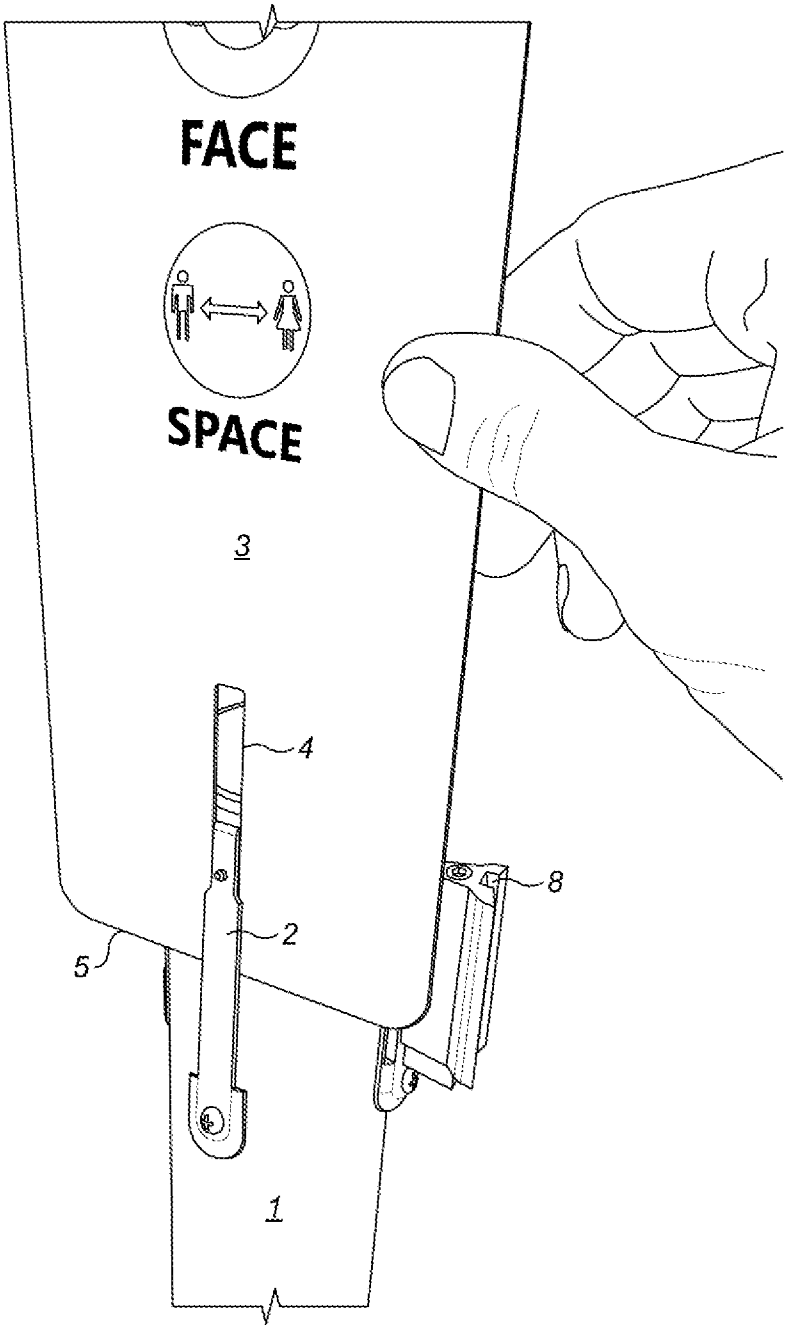
FIG. 2 is a first image of a second embodiment of a barrier sign kit according to the present invention.
Figure 3:
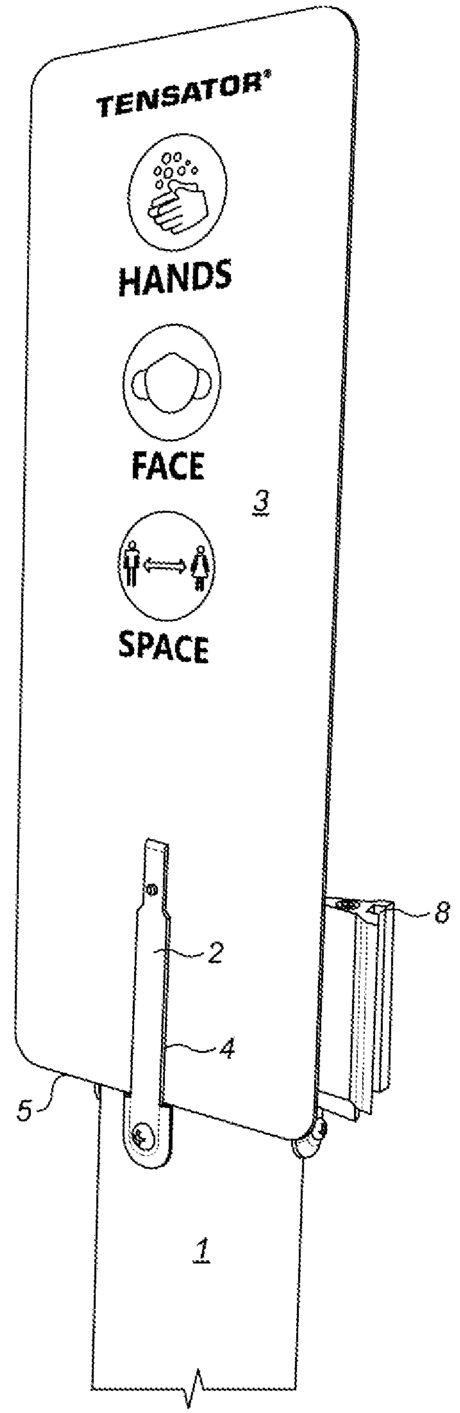
FIG. 3 is a second image of the second embodiment of the present invention.

A second embodiment of the barrier sign kit of the present invention is shown in FIGS. 2 and 3. The barrier post 1 of the second embodiment, including the spline 2 is identical to the barrier post 1 of the first embodiment. The sign member 3 differs from the first embodiment in that the aperture 4 is formed as a slot extending from the lower end 5 of the sign member 3. The sign member 3 is shown being slid into position on the spline 2 in FIG. 2 and mounted in position on the barrier post 1 in FIG. 3. The sign member 3 is mounted securely in position as a width of the slot (aperture 4) closely conforms to a lateral separation of the channels of the spline 2. This can be clearly seen in FIG. 2.

Figure 4:
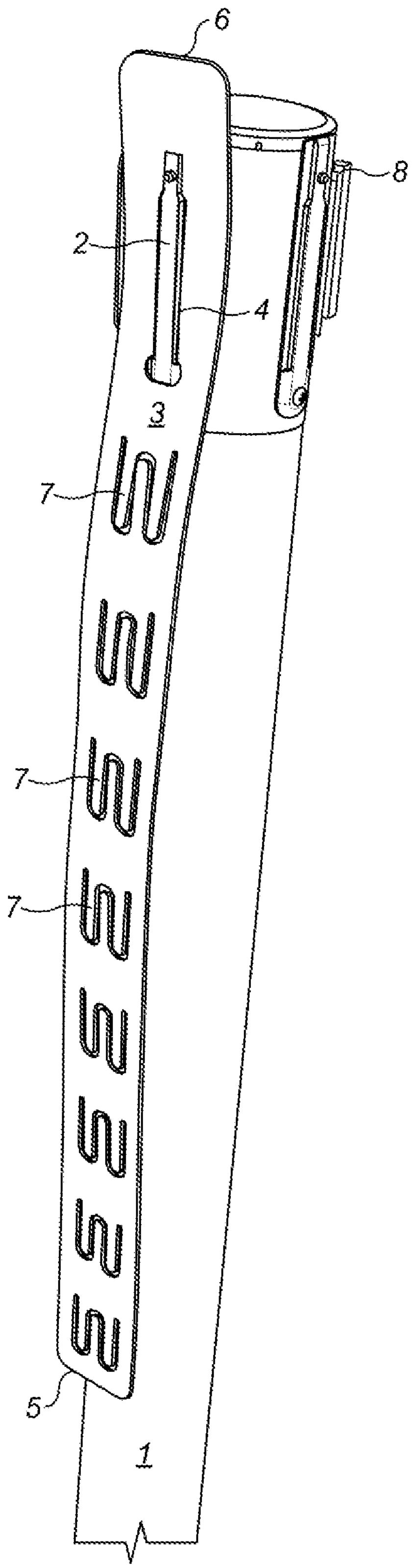
FIG. 4 is an image of a third embodiment of a barrier sign kit according to the present invention.

A third embodiment of the invention is shown in FIG. 4. The barrier post 1 and spline 2 of the third embodiment are the same as the barrier posts 1 of the first and second embodiment. The sign member 3 of the third embodiment has an aperture 4 formed proximate an upper end 6 and extends downwards from the aperture 4 such that when mounted on the barrier post 1 it hangs downward from the spline 2, rather than extending upwardly from the spline 2.

The aperture 4 of the sign member 3 has a "thermometer bulb" shape in the same manner as the sign member 3 of the first embodiment described above. Eight cut out mounting portions 7 are formed on the sign member below the aperture 4. These can be used for hanging goods from the spline 2, for example a packet of goods (not shown) can be hung from each cut out mounting portion 7. This is a conventional way of displaying goods on point of sale displays that will be immediately apparent to the skilled person.

The embodiments of the invention shown in the Figures are considered to be exemplary only and are not limiting on the scope of the present application. The scope of the present application is defined in the claims. Unless indicated otherwise by the claims or elsewhere in the description, any feature of the embodiments of the invention shown in the Figures can be incorporated in an embodiment of the invention independently from any other feature. For example, an embodiment of the invention may comprise a sign member 3 having both a downwardly extending portion (as in the third embodiment) and an upwardly extending portion (as in the first and second embodiments).

The invention claimed is:

1. A barrier sign kit consisting of:

a barrier post having one or more elongated, vertically oriented splines positioned on an outer side; and a rigid planar sign member comprising an aperture sized and shaped to securely mount the sign member on one of the one or more elongated, vertically oriented splines, wherein the aperture of the sign member comprises a vertically extending slot, wherein the sign member is formed of a polymer or formed of card.

2. A barrier sign kit according to claim 1, wherein the aperture is proximate the lower end of the sign member and, when the sign member is mounted on a spline, the sign member extends upwards from the spline.

3. A barrier sign kit according to claim 1, wherein the aperture is proximate an upper end of the sign member and, when the sign member is mounted on a spline, the sign member extends downwards from the spline.

4. A barrier sign kit according to claim 3, wherein the sign member comprises one or more cut out mounting hooks for mounting goods on the sign member.

5. A barrier sign kit according to claim 1, wherein the spline is formed to have two parallel vertically oriented channels on opposing lateral sides of the spline, the channels extending downwards from an upper end of the spline and ending a distance above a lower end of the spline.

6. A barrier sign kit according to claim 5, wherein the aperture of the sign member has a relatively narrower upper portion to conform to the channels of the spline and a relatively wider lower portion formed to conform to the lower end of the spline.

7. A barrier sign kit according to claim 1, wherein the vertically extending slot extends upwards from a lower edge of the sign member.

8. A barrier sign support comprising:

a barrier sign kit that displays a sign consisting of a barrier post having one or more elongated, vertically oriented splines positioned on an outer side; and a rigid planar sign member comprising an aperture sized and shaped to securely mount the sign member on one of the one or more elongated, vertically oriented splines, wherein the aperture of the sign member comprises a vertically extending slot, wherein the sign member is formed of a polymer or formed of card.

* * * * *